United States Patent
Bouchiat et al.

(10) Patent No.: US 8,245,361 B2
(45) Date of Patent: Aug. 21, 2012

(54) CLAMPING DEVICE

(75) Inventors: Jérome Bouchiat, Langon (FR); Nicolas Rigollet, Romorantin (FR); Gérard Motteau, Chabris (FR)

(73) Assignee: Etablissement Caillau, Issy les Moulineaux (FR)

( * ) Notice: Subject to any disclaimer, the term of this patent is extended or adjusted under 35 U.S.C. 154(b) by 234 days.

(21) Appl. No.: 12/597,401

(22) PCT Filed: Apr. 21, 2008

(86) PCT No.: PCT/FR2008/050708
§ 371 (c)(1),
(2), (4) Date: Nov. 19, 2009

(87) PCT Pub. No.: WO2008/145919
PCT Pub. Date: Dec. 4, 2008

(65) Prior Publication Data
US 2010/0115733 A1    May 13, 2010

(30) Foreign Application Priority Data
Apr. 24, 2007  (FR) ..................................... 07 54669

(51) Int. Cl.
F16B 2/08   (2006.01)
F16L 33/04  (2006.01)
F16L 33/02  (2006.01)

(52) U.S. Cl. ............................ 24/279; 285/367; 285/420

(58) Field of Classification Search ............... 24/280, 24/284, 273, 279, 274 R; 285/397, 252, 285/253, 365, 366, 368, 407, 410, 412, 420, 285/367
See application file for complete search history.

(56) References Cited

U.S. PATENT DOCUMENTS

| 848,139 A | 3/1907 | Stuppar |
| 946,207 A * | 1/1910 | Hansen .......................... 285/410 |
| 1,827,195 A * | 10/1931 | Hansen ............................. 24/279 |
| 2008/0184536 A1 * | 8/2008 | Rigollet et al. ................. 24/279 |

FOREIGN PATENT DOCUMENTS

| EP | 0 367 169 A | 5/1990 |
| GB | 2 094 385 A | 9/1982 |
| WO | WO 2006/109001 A1 | 10/2006 |

OTHER PUBLICATIONS

Office Action issued Dec. 24, 2010 in Chinese Application No. 200880013472.3 and English translation thereof.

* cited by examiner

Primary Examiner — Robert J Sandy
Assistant Examiner — Michael Lee
(74) Attorney, Agent, or Firm — Kenyon & Kenyon LLP

(57) ABSTRACT

A clamping device comprising: a collar (10) comprising: a belt (12) suitable for being disposed around one or more articles to be clamped, and at least two lugs (14, 16) that are upstanding relative to said belt towards the outside thereof; and a tightening system (18, 19) suitable for co-operating with the two lugs so as to move them closer together; in which device at least one of the two lugs has a connection portion via which it is connected to the belt (26), which connection portion is upstanding relative to said belt, and a tightening wall (30) folded back towards the belt, the tightening system coming into engagement with said tightening wall during tightening of the collar; wherein, on its outside face, the belt (12) has at least one projecting portion (40) situated between the connection portion and the tightening wall, the tightening wall (30) coming into abutment against said projecting portion (40) while the collar is being tightened.

14 Claims, 3 Drawing Sheets

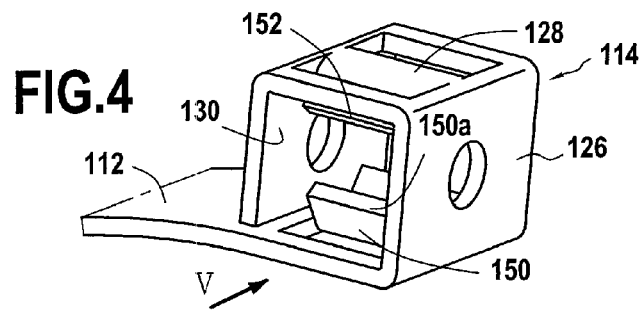
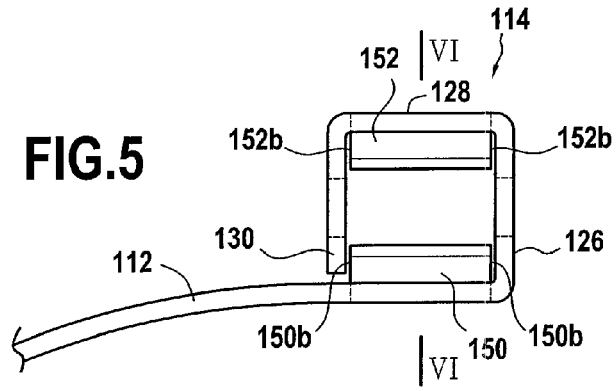
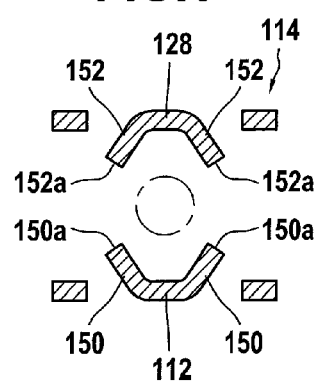
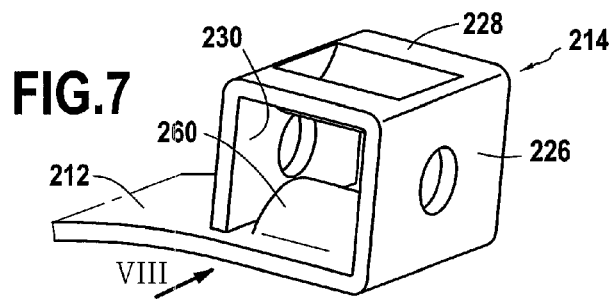
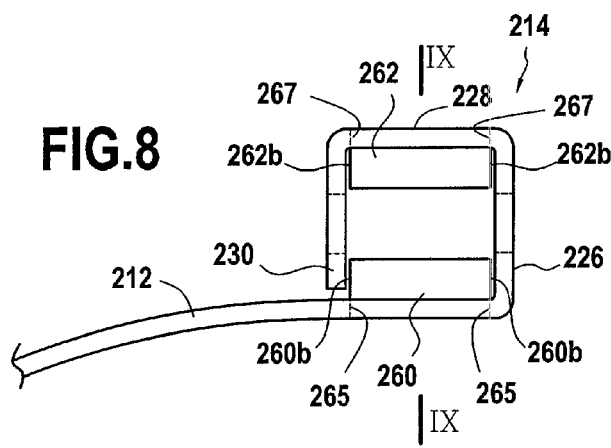
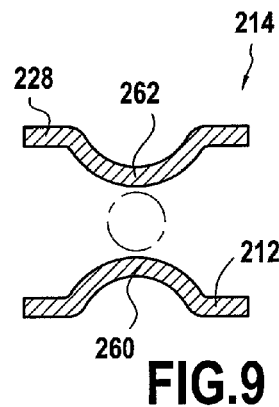

CLAMPING DEVICE

CROSS-REFERENCE TO RELATED APPLICATIONS

This is a 371 national phase application of PCT/FR2008/050708 filed 21 Apr. 2008, claiming priority to French Patent Application No. 07/54669 filed Apr. 24, 2007, the contents of which are incorporated herein by reference.

FIELD OF THE INVENTION

The present invention relates to a clamping device of the type comprising:
- a collar comprising a belt suitable for being disposed around one or more articles to be clamped, and at least two lugs that are upstanding relative to said belt towards the outside thereof; and
- a tightening system suitable for co-operating with the two lugs so as to move them closer together in such a manner as to cause the collar to be tightened;

in which device at least one of the two lugs has a connection portion via which it is connected to the belt, which connection portion is upstanding relative to said belt, and a tightening wall folded back towards the belt, the tightening system coming into engagement with said tightening wall during tightening of the collar.

The inside and the outside of the belt are defined so that the inside of the belt is the space that receives the article to be clamped.

BACKGROUND OF THE INVENTION

Devices of this type are used, for example, for clamping together two tubes disposed end-to-end.

Said tightening system is most often a nut-and-bolt fastener.

In addition, most often, the belt is of annular general shape centered on an axis referenced A, and the collar is tightened by reducing the diameter of the belt. Thus, in the present patent application, the axial direction corresponds to the direction of the axis A, and a radial direction is a direction perpendicular to the axis A. The circumferential direction is defined relative to the circumference of the belt.

U.S. Pat. No. 848,139 and Patent Application EP 0 367 169 A1 describe known examples of clamping devices of the above-mentioned type.

Such known devices comprise collar belts of generally annular shape and nut-and-bolt fasteners serving as the tightening systems. The tightening walls and the connection portions of the lugs of the collar are provided with openings through which the shank of the bolt passes. Assembly clearance exists between the openings and the shank of the bolt. During tightening, the head of the bolt and the nut come to bear against respective ones of the tightening walls of the facing lugs, so as to bring the lugs closer together and so as to cause the collar to be tightened, by reducing the diameter of the belt.

Although the collar of U.S. Pat. No. 848,139 is generally satisfactory, it has been observed that, for certain demanding uses, each lug is deformed (it "unfolds") under the effect of the tightening forces (the amplitude of that deformation depending on the above-mentioned assembly clearance) at the hinge zone between the connection portion and the belt of the collar. The facing lugs then tilt towards each other, thereby reducing the effectiveness of the clamping of the collar.

That problem of the lugs tilting is avoided with the collar of EP 0 367 169 A1 because the tightening walls of the lugs are welded to the belt of the collar. However, welding the tightening walls to the belt constitutes an additional and costly step in manufacturing the collar. In addition, the link formed by such welding is, by nature, a totally rigid link that deprives the tightening wall of any freedom of movement. However, the tightening wall constitutes the bearing zone for the bolt head or for the nut, so that it is generally preferred for said wall to continue to have a small amount of freedom of movement so that the bolt head or the nut bears optimally against said wall (naturally, that freedom must remain limited in order not to reduce the effectiveness of the collar).

SUMMARY OF THE INVENTION

An object of the present invention is to improve the above-described state of the art.

To achieve this object, the invention provides a clamping device of the above-mentioned type, characterized in that, on its outside face, the belt has at least one projecting portion situated between the connection portion and the tightening wall, the tightening wall coming into abutment against said projecting portion while the collar is being tightened.

By means of this configuration, the projecting portion carried by the belt retains the lug and prevents it from tilting.

In addition, the tightening wall continues to have a certain amount of freedom of movement (so long as it is not in abutment against the projecting portion), thereby making it possible to guarantee good relative positioning and therefore good bearing between said wall and the elements of the tightening system used.

It should be noted that the tightening forces are applied directly on the tightening wall, i.e. remote from the connection portion.

As regards the tightening system, it is most often a nut-and-bolt fastener but it could also be a threaded rod and two nuts.

It should also be noted that the collar of the invention may be provided with one or more "special" lugs with connection portions, tightening walls, and projecting portions on the belt of the collar. In particular, when the collar has two lugs in all, it may have one or more "special" lugs and, when the collar has four lugs in all, it may have two or four "special" lugs.

In an embodiment, said projecting portion is formed by a tongue cut out from the belt and upstanding towards the outside of said belt. This tongue therefore projects relative to the outside face of the belt. Said tongue is terminated by a free end. In a first example, the free end points towards the tightening wall. In which case, the tightening wall can come into abutment against said free end while the collar is being tightened. In a second example, said free end points towards a side face of the collar, and the tightening wall can come into abutment against a side of the tongue while the collar is being tightened. It should be noted that if the tightening forces applied to the tightening wall are large, a tongue that points as in the second example is preferred because there is less risk of it deforming (in particular, there is no risk of it turning over) under the effect of the tightening forces.

In an embodiment, said projecting portion is formed by a projection formed by deforming the belt outwards. This projection thus projects relative to the outside face of the belt and the tightening wall comes into abutment against said projection while the collar is being tightened. Advantageously, in order to prevent the tightening wall from being able to pass over the projection in the event that the collar is tightened hard, and, more generally, in order to improve the bearing of the tightening wall on the projection, the projection is slit so as to have at least one clean-cut edge against which the tightening wall comes into abutment. This clean-cut edge forms a bearing rib for the tightening wall.

In an embodiment, said projecting portion (regardless of whether it is a tongue or a projection) forms a spacer between the tightening wall and the connection portion. In other words, during tightening, the tightening wall and the connection portion come into abutment on either side of the projecting portion, so that, thereafter, the spacing between the tightening wall and the connection portion is maintained constant.

In another embodiment, the tightening wall carries a tab and said projecting portion defines a recess under it that is designed to receive said tab. This co-operation between the tab and the projecting portion can make it possible to limit the possibilities of the tightening wall moving radially and/or to center the tightening wall relative to the belt.

In another embodiment, instead of said tab, the tightening wall is provided with a slot in which the projecting portion in the form of a tongue can engage during tightening. The portion of tightening wall that is situated under said slot then comes to be received under the tongue and comes into abutment against said tongue during tightening.

In an embodiment, in order to make it possible to center the tightening wall relative to the belt, the tightening wall carries two side legs extending on either side of the belt. Axial movement of the tightening wall is thus limited by said legs which are in abutment against the side edges of the belt or which come rapidly into abutment thereagainst in the event of loss of centering.

In an embodiment, the lug having the connection portion and the tightening wall also has a link wall between the connection portion and the tightening wall, the profile of the lug being generally U-shaped, with the base of the U-shape being formed by said link wall.

In order to avoid flattening the top portion of the U-shaped lug under the effect of the tightening forces, in a first example, said link wall has at least one other projecting portion that forms a spacer between the connection portion and the tightening wall. This other projecting portion extends between the connection portion and the tightening wall and may be formed by a tongue cut out from said link wall and having its free end pointing towards one of the side faces of the collar, or by a projection formed by deforming said link wall, or indeed by a side flange of the link wall that is folded over towards the inside of the lug. In a second example, the connection portion, the link wall, and the tightening wall are provided with respective side flanges folded over towards the inside of said lug, the side flanges of the link wall forming spacers between the side flanges of the connection portion and of the tightening wall.

BRIEF DESCRIPTION OF THE DRAWINGS

The invention can be better understood and its advantages appear more clearly on reading the following detailed description of embodiments of the invention shown by way of non-limiting illustration. The description refers to the accompanying sheets of drawings, in which:

FIG. 4 is a detail perspective view analogous to the FIG. 2 view, showing another example of a collar;

FIG. 5 is a side view seen looking along arrow V of FIG. 4;

FIG. 6 is a view in axial section, on the plane VI-VI of FIG. 5;

FIG. 7 is a detail perspective view analogous to the FIG. 2 view, showing another example of a collar;

FIG. 8 is a side view seen looking along arrow VIII of FIG. 7; and

FIG. 9 is a view in axial section, in the plane IX-IX of FIG. 8.

DETAILED DESCRIPTION

Figure 1:
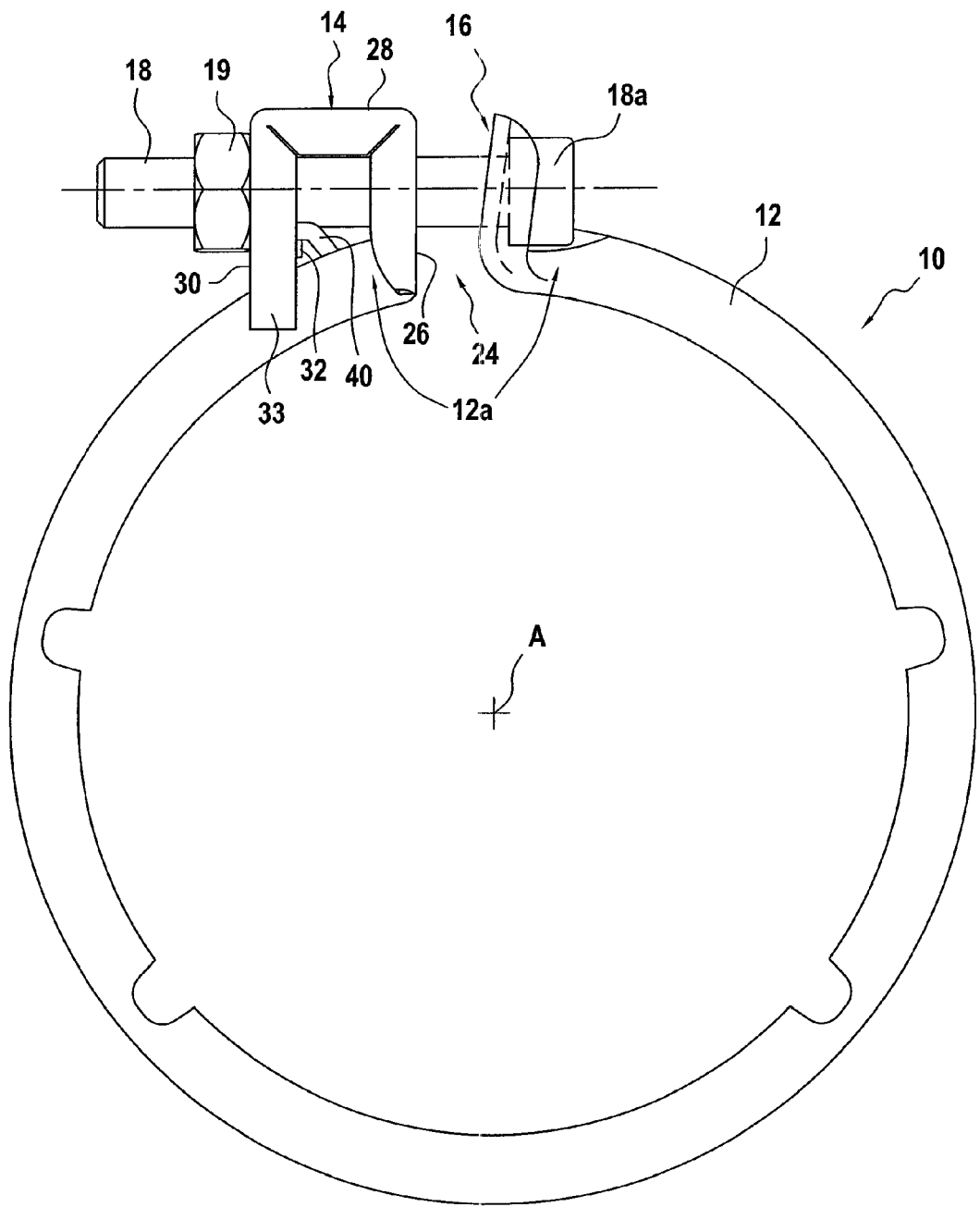
FIG. 1 is a side view of an example of a clamping device of the invention.
Figure 2:
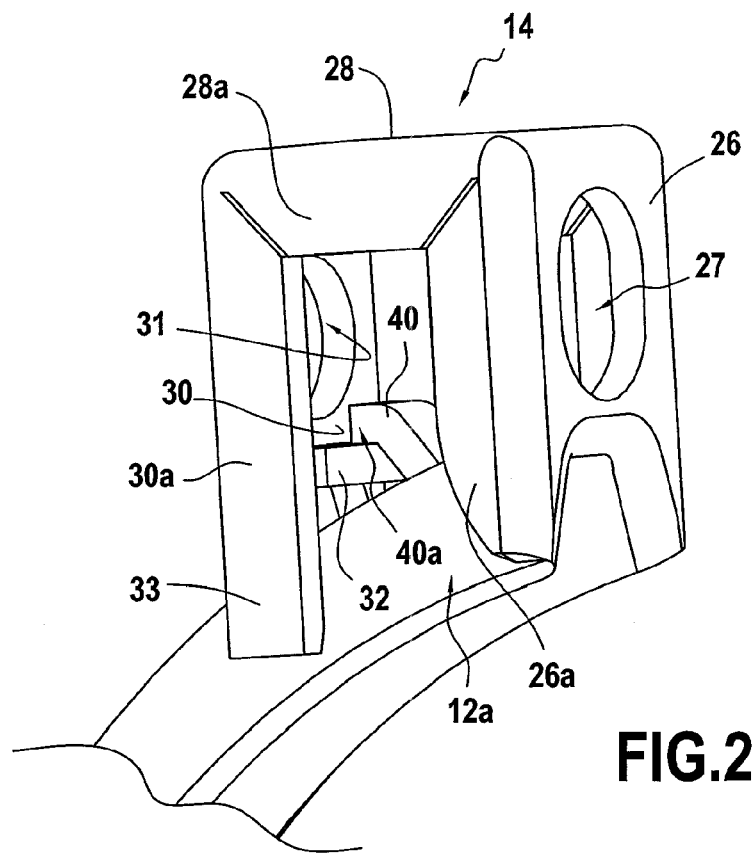
FIGS. 2 and 3 are detail perspective views showing a lug of the collar of the device of FIG. 1.
Figure 3:
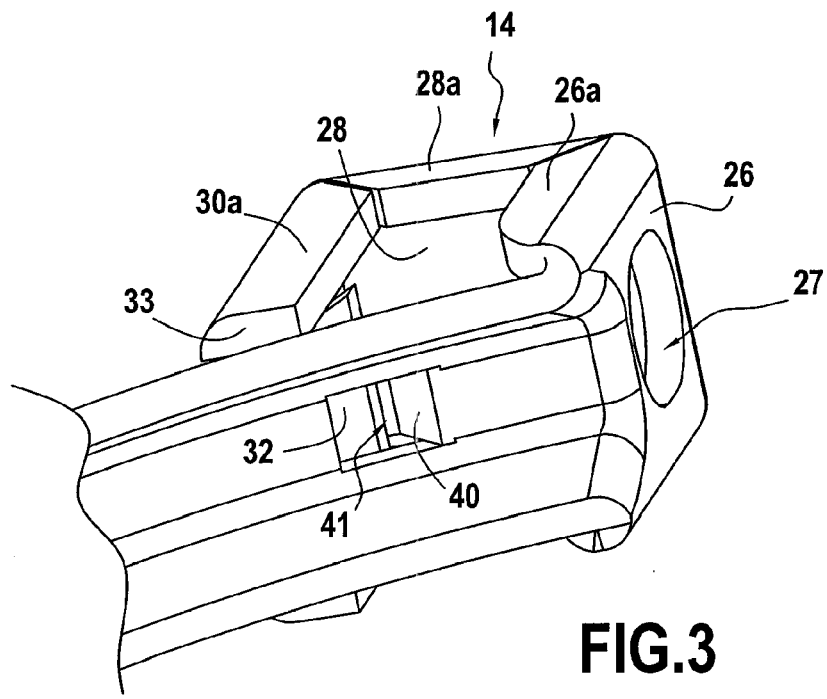

The clamping device shown in FIGS. 1 to 3 comprises:
a collar 10 with an annular belt 12 of axis A and two lugs 14, 16 integral with the ends 12A of the belt 12 and upstanding relative to said belt, towards the outside thereof, so that the lugs 14, 16 extend substantially radially; and
a tightening system suitable for co-operating with the two lugs 14, 16 so as to bring them closer together in such a manner as to cause the collar to be tightened by reducing the diameter of the belt 12.

In the example, the collar 10 is made of the same metal strip by deforming said strip by folding and/or die-stamping.

As can be seen in FIG. 1, the lugs 14, 16 are disposed facing each other and they define a slot 24 between them. The tightening system shown comprises a bolt 18 and a nut 19 co-operating with the threaded shank of the bolt. The nut 19 co-operates with one of the lugs 14, while the head 18a of the bolt 18 co-operates with the other lug 16. Optionally, the shape of the lug 16 is adapted so that the head 18a of the bolt is prevented from moving in rotation when it bears against the lug 16. It can be understood that as the nut-and-bolt fastener is tightened, so the width of the slot 24 decreases.

This clamping device is used to connect together two tubes, e.g. two exhaust tubes, in leaktight manner. The belt 12 of the collar clamps the tubes together. For this purpose, the belt 12 has an inside periphery that is V-shaped in section giving it a two-cone shape. At its end, the first tube to be clamped has two frustoconical bearing surfaces, while the second tube to be clamped has one frustoconical bearing surface that comes into abutment against a bearing surface of the first tube. Alternatively, at its end, each of the first and second tubes to be clamped has one frustoconical bearing surface. Thus, the bearing surfaces of the tubes are clamped in the inside two-cone shape of the belt 12, and the collar 10 being tightened brings the tubes towards each other.

The shape of the lug 14 is explained in more detail below with reference to FIGS. 2 and 3.

Going from its connection zone, via which it is connected to the belt 12, to its free end, and in the following order, the lug 14 comprises:
a connection portion 26 via which it is connected to the belt 12 of the collar, which portion is upstanding (i.e. raised) relative to said belt, towards the outside thereof, and extends substantially radially;
a link wall 28 that extends the connection portion 26 and that extends substantially circumferentially; and
a tightening wall 30 that extends the link wall 28 and that is folded back towards the belt 12 so that it extends substantially radially, said tightening wall 30 being the free end portion of the lug 14.

Since the lug 14 is raised relative to the belt 12, the belt 12 and the connection portion 26 define, between them, a zone that has a small radius of curvature. Thus, while the collar 10 is being tightened, the belt 12 (including the ends 12A thereof) comes into contact with the article to be clamped, whereas the lugs 14, 16 (including their connection portions 26) do not come into contact with the article to be clamped, but they can optionally come into contact with each other.

The profile of the lug 14 is substantially U-shaped, the base of the U-shape being formed by the link wall 28 and its branches being formed by the connection portion 26 and by the tightening wall 30. Thus, the connection portion 26 and the link wall 28, and also the link wall 28 and the tightening wall 30 define between them respective zones that have a small radius of curvature, and a free space is provided between the connection portion 26 and the tightening wall 30.

The tightening wall 30 and the connection portion 26 are provided with respective openings 31 and 27 for passing the shank of the bolt 18.

The opening 27 is oblong so as to enable the position of the shank of the bolt 18 to be adjusted while the collar is being put in place and while it is being tightened.

The tightening wall 30 is that portion of the lug 14 with which the tightening system, and more precisely the nut 19, comes into engagement. The fact that the tightening wall 30 is distinct and sufficiently remote from the connection portion 26 enables the bolt 18 to be close to the slot 24 and to extend as tangentially as possible relative to the circumference of the belt 12 at the slot 24, while also leaving the nut 19 accessible and easily actuatable by a tightening tool (because the radial distance between the nut 19 and the belt 12 is sufficient to enable said tool to pass therebetween). The tangential angular positioning of the bolt is one of the conditions for obtaining good tightening of the collar without exerting tightening forces that are too large on the lugs 14, 16.

In accordance with the invention, on its outside face, the belt 12 has at least one (one in this example) projecting portion situated between the connection portion 26 and the tightening wall 30. This projecting portion projects relative to the outside face of the belt 12, towards the outside of said belt 12.

In the example, this projecting portion is formed by a tongue 40 that is cut out from the belt 12 and that is upstanding towards the outside of said belt. The cutout formed to obtain this tongue 40 can be seen clearly in FIG. 3. Said tongue 40 is terminated by a free end 40a pointing towards the tightening wall 30. The tongue 40 defines a recess 41 under it.

In addition, the tightening wall 30 is provided with tab 32. This tab 32 is formed by folding a portion of the free edge of the tightening wall 30 towards the inside of the lug 14. The tab 32 is received under the tongue 40 inside the recess 41.

While the collar is being tightened, the tab 32 comes into abutment against the inside face of the tongue 40. The tab 32 and the tongue 40 co-operating makes it possible to limit the circumferential movement and the radial movement of the tightening wall 30.

In addition, the tightening wall 30 is provided with two side legs 33 extending on either side of the belt 12 so that the tightening wall 30 straddles the belt 12. This makes it possible to center the tightening wall 30 relative to the belt 12.

Finally, the connection portion 26, the link wall 28 and the tightening wall 30 have respective side flanges 26a, 28a, and 30a, folded over towards the inside of the lug 14. All of the side flanges situated on the same side of the collar lie in the same plane so that the side flange 28a of the link wall forms a spacer between the side flanges 26a and 30a of the connection portion and of the tightening wall. For this purpose, the zones of the flanges 26a, 28a, and 30a that are in contact are beveled. By means of this configuration, it is possible to prevent the top portion of the lug 14, and in particular of the link wall 28, from deforming under the effect of the tightening forces.

FIGS. 4, 5, and 6, and FIGS. 7, 8, and 9 show respective ones of two other examples of lug shapes for two other examples of collars. The same numerical references plus 100 or plus 200 are used to designate elements that are analogous in these two collars and in the collar of FIGS. 1 to 3.

In both of these other examples, the collars have belts 112, 212 that are of flat profile in axial section. This type of collar can be used for connecting together two tubes having smooth ends.

In both cases, the profile of the lug 114, 214 is generally U-shaped, with the base of the U-shape being formed by a link wall 128, 228 and its branches being formed by a connection portion 126, 226 via which it is connected to the belt 112, 212, and by a tightening wall 130, 230.

In the example shown in FIGS. 4, 5, and 6, on its outside face, the belt 112 has two projecting portions situated between the connection portion 126 and the tightening wall 130. These projecting portions are formed by tongues 150 cut out from the belt 112 and upstanding towards the outside of said belt. Each of the tongues 150 has a free end 150a pointing towards a side face of the collar. Each tongue 150 extends from the connection portion 126 to the tightening wall 130 in such a manner as to form a spacer between the tightening wall 130 and the connection portion 126. Thus, while the collar is being tightened, the tightening wall 130 and the connection portion 126 come into abutment against respective ones of the opposite sides 150b of the tongues 150, thereby making it possible to avoid flattening the lug 114.

Similarly, on its inside face, the link wall 128 presents two projecting portions formed by tongues 152 cut out from the belt 112 and upstanding towards the inside of the lug 114 (i.e. towards the belt 112). Each of these tongues 152 has a free end 152a pointing towards a side face of the collar. Each tongue 152 extends from the connection portion 126 to the tightening wall 130 in such a manner as to form a spacer between the tightening wall 130 and the connection portion 126. Thus, while the collar is being tightened, the tightening wall 130 and the connection portion 126 come into abutment with respective ones of the opposite sides 152b of the tongues 150, thereby making it possible to avoid flattening the lug 114.

In the example shown in FIGS. 7, 8, and 9, on its outside face, the belt 212 has a projecting portion situated between the connection portion 226 and the tightening wall 230. This projecting portion is formed by a projection 260 formed by deforming the belt 212 outwards.

In order to form the projection 260, axial slits 265 are formed in the belt 212 in the vicinities of the connection portion 226 and of the tightening wall 230, and the belt portion 212 that is situated between said slits 265 is deformed outwards. The opposite sides 260b of the resulting projection 260 are therefore slit and have clean-cut edges.

The projection 260 extends from the connection portion 226 to the tightening wall 230 in such a manner as to form a spacer between the tightening wall 230 and the connection portion 226. Thus, while the collar is being tightened, the tightening wall 230 and the connection portion 226 come into abutment with respective ones of the opposite sides 260b of the projection 260, thereby making it possible to avoid flattening the lug 214.

In the same way, on its inside face, the link wall 228 has a projecting portion situated between the connection portion 226 and the tightening wall 230. This projecting portion is formed by a projection 262 formed by deforming the link wall 228 towards the inside of the lug (i.e. towards the belt 212).

In order to form the projection 262, axial slits 267 are formed in the link wall 228 in the vicinities of the connection portion 226 and of the tightening wall 230, and the portion of link wall 228 that is situated between said slits 267 is deformed inwards. The opposite sides 262b of the resulting projection 262 are therefore slit and have clean-cut edges.

The projection 262 extends from the connection portion 226 to the tightening wall 230 in such a manner as to form a spacer between the tightening wall 230 and the connection portion 226. Thus, while the collar is being tightened, the tightening wall 230 and the connection portion 226 come into abutment with respective ones of the opposite sides 262b of the projection 262, thereby making it possible to avoid flattening the lug 214.

The invention claimed is:

1. A clamping device comprising:
  a collar comprising a belt suitable for being disposed around one or more articles to be clamped, and at least two lugs that are upstanding relative to said belt towards the outside thereof; and
  a tightening system suitable for co-operating with the two lugs so as to move them closer together in such a manner as to cause the collar to be tightened;
  in which device at least one of the two lugs has a connection portion via which it is connected to the belt, which connection portion is upstanding relative to said belt, and a tightening wall folded back towards the belt, the tightening system coming into engagement with said tightening wall during tightening of the collar;
  said clamping device being such that, on its outside face, the belt has at least one projecting portion situated between the connection portion and the tightening wall, the tightening wall coming into abutment against said projecting portion while the collar is being tightened.

2. A device according to claim 1, wherein said projecting portion is formed by a tongue cut out from the belt and upstanding towards the outside of said belt.

3. A device according to claim 2, wherein said tongue has a free end pointing towards the tightening wall.

4. A device according to claim 2, wherein said tongue has a free end pointing towards a side face of the collar.

5. A device according to claim 1, wherein said projecting portion is formed by a projection formed by deforming the belt.

6. A device according to claim 5, wherein said projection is slit so as to have at least one clean-cut edge against which the tightening wall comes into abutment while the collar is being tightened.

7. A device according to claim 1, wherein said projecting portion forms a spacer between the tightening wall and the connection portion.

8. A device according to claim 1, wherein the tightening wall carries a tab and wherein said projecting portion defines a recess under it that is designed to receive said tab.

9. A device according to claim 1, wherein the tightening wall has a free end and carries, at its free end, two side legs extending on either side of the belt in such a manner as to center the tightening wall relative to the belt.

10. A device according to claim 1, wherein the lug having the connection portion and the tightening wall also has a link wall between the connection portion and the tightening wall, the profile of the lug being generally U-shaped, with the base of the U-shape being formed by said link wall.

11. A device according to claim 10, wherein, on its inside face, said link wall has at least one other projecting portion that forms a spacer between the connection portion and the tightening wall.

12. A device according to claim 10, wherein the connection portion, the link wall, and the tightening wall are provided with respective side flanges folded over towards the inside of said lug, the side flanges of the link wall forming spacers between the side flanges of the connection portion and of the tightening wall.

13. A device according to claim 1, wherein said tightening system is a nut and bolt fastener, the tightening wall and the connection portion being provided with openings for passing the shank of the bolt, and the head of the bolt or the nut coming to bear against the tightening wall.

14. A device according to claim 1, wherein said belt and said connection portion define between them a zone that has a small radius of curvature.

* * * * *